United States Patent
Wobben

(10) Patent No.: US 7,204,673 B2
(45) Date of Patent: Apr. 17, 2007

(54) METHOD OF CONTROLLING A WIND POWER INSTALLATION

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 175 days.

(21) Appl. No.: 10/432,570

(22) PCT Filed: Nov. 15, 2001

(86) PCT No.: PCT/EP01/13202

§ 371 (c)(1),
(2), (4) Date: Nov. 3, 2003

(87) PCT Pub. No.: WO02/42641

PCT Pub. Date: May 30, 2002

(65) Prior Publication Data

US 2004/0105751 A1    Jun. 3, 2004

(30) Foreign Application Priority Data

Nov. 23, 2000   (DE) ................................. 100 58 076

(51) Int. Cl.
*F03D 7/04* (2006.01)
(52) U.S. Cl. ............................ 416/1; 416/31; 416/32; 416/37; 416/41; 416/48
(58) Field of Classification Search ............ 416/1, 416/31, 32, 37, 41, 44, 47, 48; 290/44, 55
See application file for complete search history.

(56) References Cited

U.S. PATENT DOCUMENTS

| | | | |
|---|---|---|---|
| 4,213,734 A | 7/1980 | Lagg | |
| 4,426,192 A | 1/1984 | Chertok et al. | |
| 4,474,531 A | 10/1984 | Weiss | |
| 4,584,486 A | 4/1986 | Quynn | |
| 4,966,525 A | 10/1990 | Nielsen | |
| 5,278,773 A | 1/1994 | Cousineau | |
| 6,361,275 B1 * | 3/2002 | Wobben | 416/33 |
| 6,619,918 B1 * | 9/2003 | Rebsdorf | 416/1 |
| 6,784,564 B1 * | 8/2004 | Wobben | 290/44 |
| 6,809,431 B1 * | 10/2004 | Schippmann | 290/55 |

FOREIGN PATENT DOCUMENTS

| | | |
|---|---|---|
| DE | 31 06 624 A1 | 9/1982 |
| DE | 195 32 409 A1 | 3/1997 |
| DE | 197 17 059 C1 | 7/1998 |
| DE | 197 56 777 A1 | 7/1999 |
| DE | 198 44 258 A1 | 3/2000 |

* cited by examiner

*Primary Examiner*—Christopher Verdier
(74) *Attorney, Agent, or Firm*—Seed IP Law Group PLLC

(57) ABSTRACT

A method for controlling a wind power installation at very high wind speeds, in which there is predetermined a first wind speed at which the rotor blades of the wind power installation are put into a first predetermined setting. In addition, the method includes controlling the wind power installation during an extreme wind situation where the rotor blades moved to a position to reduce, as far as possible, mechanical loadings on the wind power installation caused by the extreme wind situation.

13 Claims, 3 Drawing Sheets

METHOD OF CONTROLLING A WIND POWER INSTALLATION

TECHNICAL FIELD

The present invention concerns a method of controlling a wind power installation at very high wind speeds, in which there is predetermined a first wind speed at which the rotor blades of the wind power installation are put into a first predetermined setting. The present invention further concerns a wind power installation, in particular for carrying out such a control method, comprising an azimuth drive and a rotor with at least one individually adjustable rotor blade.

BACKGROUND OF THE INVENTION

One method of controlling a wind power installation is described in DE 195 32 409. Another method of controlling a wind power installation at high wind speeds is described in Erich Hau, 'Windkraftanlagen' ['Wind power installations'], Springer Verlag, 2nd edition, 1996, pages 89 ff and 235 ff.

That known state of the art predominantly describes measures which are adopted to protect wind power installations from overloading, at very high wind speeds. In that respect, in particular mechanical loadings are taken into consideration in order to avoid damage to the installation and/or individual components.

The standard measure described is usually putting the rotor blades into a so-called feathered position. It will be noted however that a necessary condition for that purpose is that there is a possibility of varying the angle of attack of the rotor blades-so-called pitch adjustment. If such a possibility does not exist, a flow breakdown or stall condition is brought about at the rotor blades in order to implement a relief of the load on the wind power installation.

A disadvantage with those known methods however is that no measures are specified for wind speeds which continue to rise, above the first predetermined wind speed, so that it is only possible to trust that the installations are adequately dimensioned to prevent complete destruction of the installation and unavoidable acute endangerment, which this would involve, to the relatively close area around the installation.

SUMMARY OF THE INVENTION

Therefore one object of the present invention is to provide a method of controlling a wind power installation and a wind power installation for carrying out that method, which in an extreme wind situation are in a position to reduce as far as possible mechanical loadings on the wind power installation, which occur due to that extreme wind.

To attain that object, the method of the kind set forth in the opening part of this specification for controlling a wind power installation is developed in such a way that upon the attainment of a second predetermined wind speed the machine housing is put into a predeterminable azimuth position. In that way it becomes possible for the action taken to protect the wind power installation by suitable adjustment of the rotor blades, to be supported by adjustment of the rotor into a position in which the wind resistance is particularly low.

In a preferred embodiment of the invention the rotor is rotated to leeward by adjustment of the azimuth position so that it is on the side of the pylon of the wind power installation, which is remote from the wind.

In a particularly preferred embodiment of the method, besides the azimuth positioning of the machine housing and therewith the leeward orientation of the rotor the angle of attack of the adjustable rotor blades is so adjusted that they represent the lowest possible level of resistance for the wind. In that way the loading on the entire wind power installation can be markedly reduced. For that purpose the rotor blades are in turn moved into the feathered position.

Particularly preferably the control according to the invention can be such that in particular the loadings at one or more rotor blades are detected. Such detection can be effected for example by ascertaining the wind speed at the rotor blade, the deformation of the rotor blade and/or other suitable ways (measurement of the tensile and compression forces at the rotor blade or the rotor hub).

In a preferred development of the invention the twisting of cables which extend in particular from the machine housing into the pylon, or vice-versa, is taken into account when establishing the direction of movement for adjustment of the azimuth position of the machine housing. In that way avoidable damage can actually be avoided. The first predetermined wind speed of the order of magnitude of about 20 m/s is also usually referred to as the shut-down speed or limit speed. At that speed or a value somewhat thereabove, for example 25 m/s wind speed, most wind power installations shut down, that is to say, the entire rotor is braked and then no further power generation takes place.

In a particularly preferred development of the method the azimuth brake and/or the rotor brake are released so that the wind blowing against the installation adjusts the leeward rotor automatically into the position with the lowest wind resistance, while at the same time the forces at the rotor blades themselves can be reduced by possible rotation of the rotor so that the method according to the invention provides that the wind power installation is adjusted in such a way that it can escape the forces of the wind as far as possible.

BRIEF DESCRIPTION OF THE DRAWINGS

Further advantageous embodiments of the invention are characterized by the appendant claims.

An embodiment by way of example of the invention is described in greater detail hereinafter with reference to the drawings in which.

DETAILED DESCRIPTION OF THE INVENTION

Figure 1:
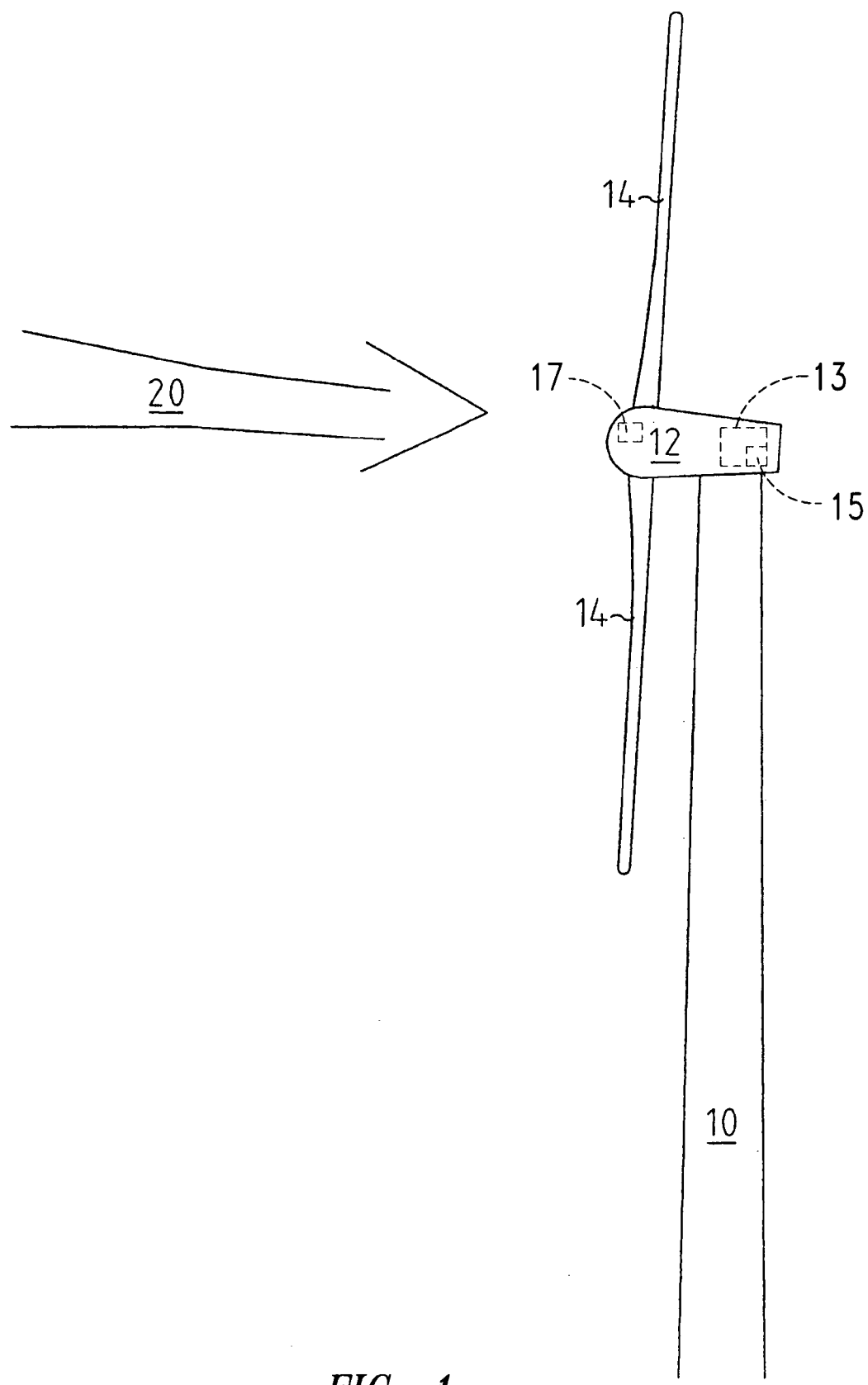
FIG. 1 shows a wind power installation in normal operation.

FIG. 1 shows a wind power installation which is in the form of a windward rotor—that is to say the rotor is at the side of the pylon 10, which is towards the wind. Disposed at the tip of the pylon 10 is the machine housing 12 with the generator (not shown) and the rotor blades 14.

In this Figure this wind power installation shown by way of example is illustrated in normal operation and the rotor blades 14 are so adjusted that they take the maximum power from the wind which is indicated by an arrow 20 to convert it into electrical energy.

Figure 2:
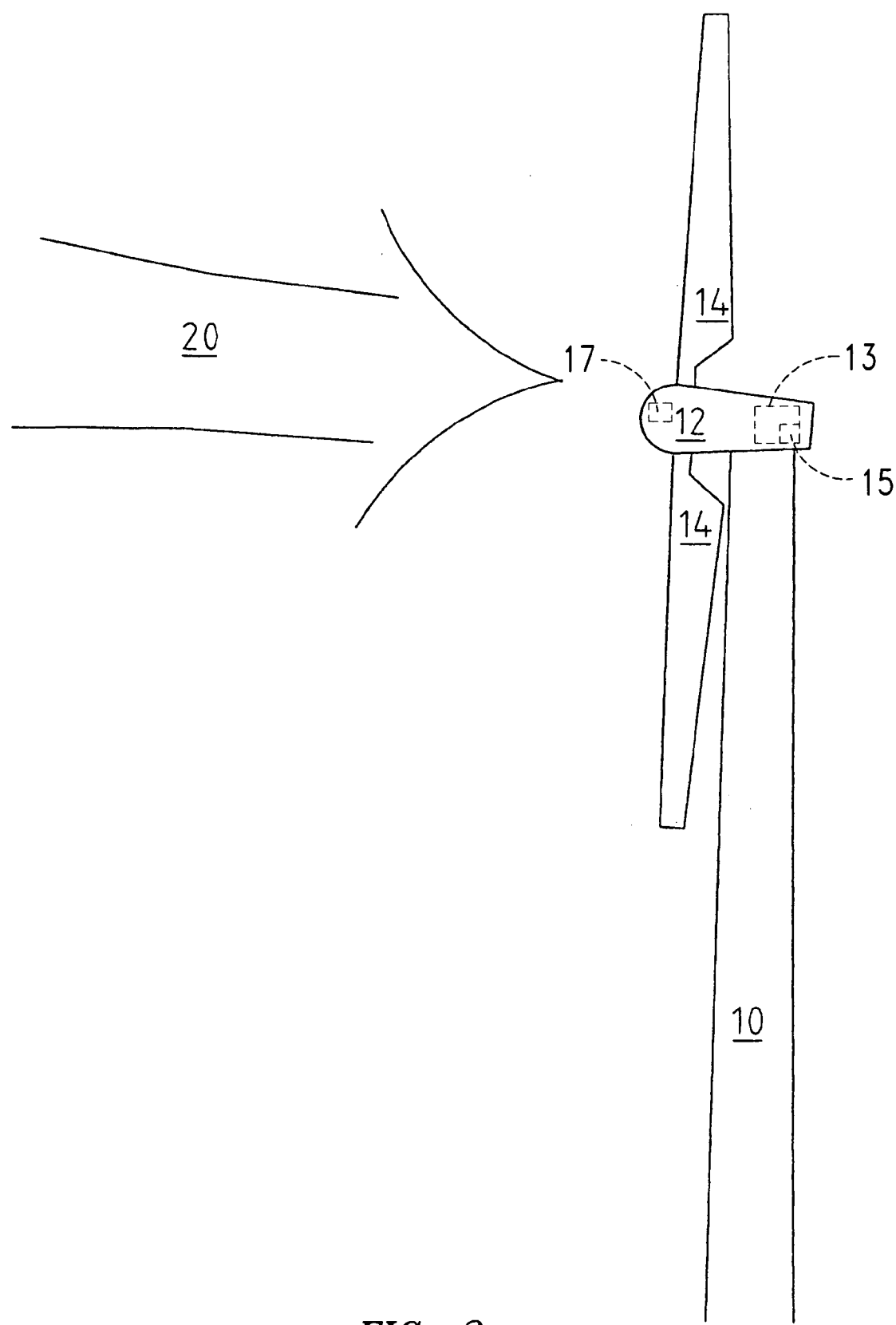
FIG. 2 shows a wind power installation which has been adjusted by the method according to the invention after a first wind speed is reached.

FIG. 2 also shows a wind power installation with a pylon 10, at the tip of which there is a machine housing 12. This Figure shows a possible setting of the rotor blades 14 which is brought about by the control 13 in accordance with the invention when a first predetermined wind speed, for example 20 m/s, is reached or exceeded. The control 13 may include at least one microprocessor 15. The wind loads on the rotor blades 14 are detected by wind load detector 17 located in the rotor side of machine housing 12. The rotor blades 14 are rotated into a so-called feathered position in which they are so oriented that they involve the lowest level of wind resistance when the wind speed exceeds a first threshold value.

In that way the loading which the wind 20 blowing against the installation exerts on the wind power installation 10, 12, 14 by way of the rotor blades 14 is markedly reduced. In addition in this position the flow naturally does not bear against the rotor blades 14 so that the corresponding (lift) forces are also not produced. Accordingly no rotor rotation occurs.

In the case of wind power installations in which a variation in the angle of attack of the rotor blades 14 is not possible, a reaction on the part of the control 13 corresponding to the method in accordance with the invention can be, for example, a part of the rotor blade, preferably an outer part which is as far as possible from the rotor hub (not shown) is adjusted in such a way that the flow at the rotor blades breaks down and thus rotation is stopped.

In that condition however the forces acting on the rotor blades 14, the machine housing 12 and the pylon 10 are always still relatively great and in particular the azimuth adjustment arrangement has to withstand considerable loadings.

Figure 3:
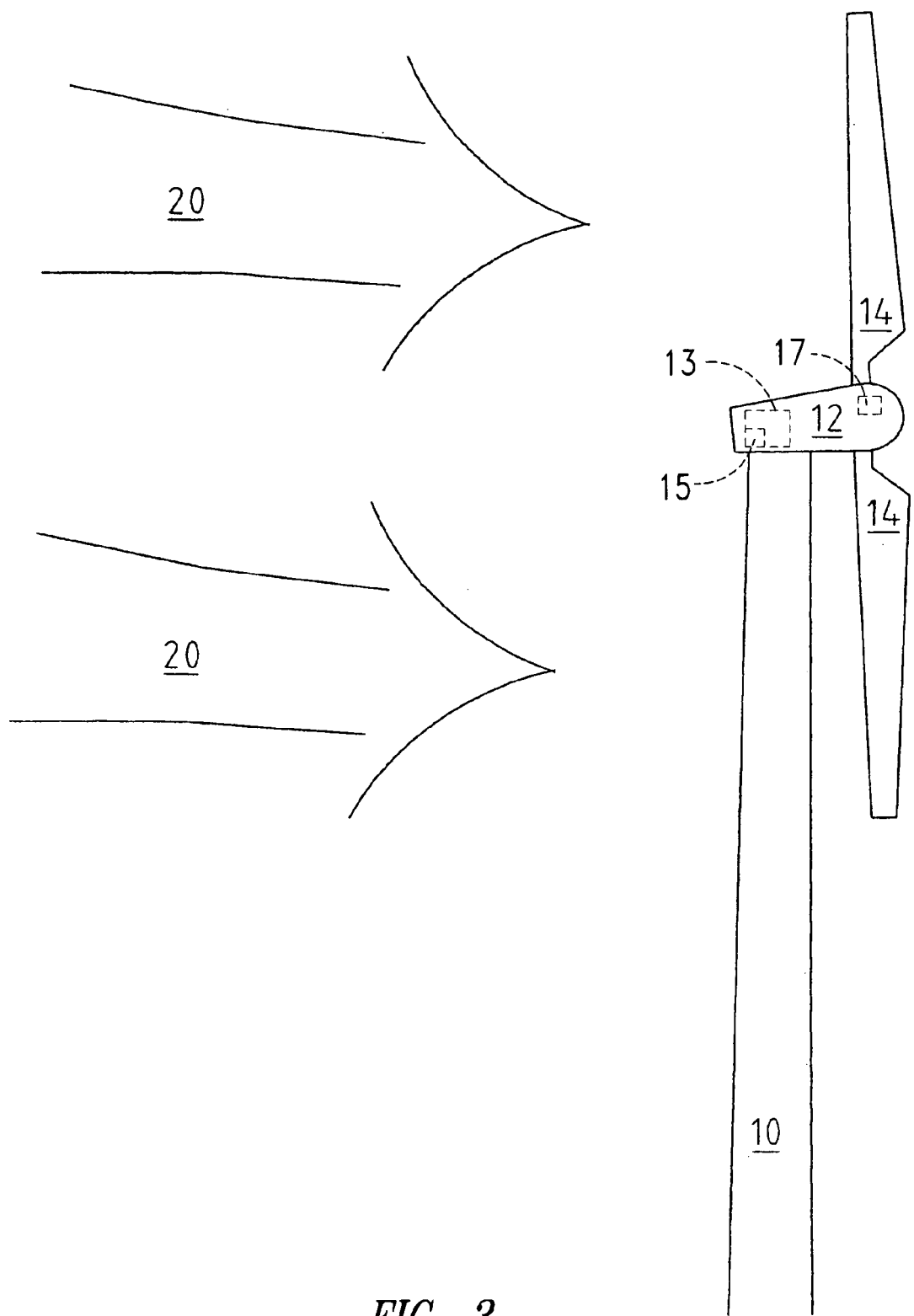
FIG. 3 shows a wind power installation which has been adjusted by the method according to the invention upon the attainment of a second predetermined wind speed.

In order to avoid damage the control 13 according to the invention therefore adjusts the azimuth position of the machine housing 12 upon the attainment of a second predetermined wind speed of for example more than 30 m/s–50 m/s, in such a way that the rotor is to leeward, that is to say at the side of the pylon 10, which is remote from the wind. This is shown in FIG. 3. The second predetermined wind speed is of an order of magnitude such that reference can be made to a gale-force storm or a hurricane. At such wind speeds there is usually nothing moving on previously known wind power installations because both the azimuth brake and also the rotor brake provide for complete stoppage of the installation.

In FIG. 3 the machine housing 12 at the tip of the pylon is so positioned that the wind 20 firstly flows past the pylon 10 and only then reaches the rotor with the rotor blades 14. By virtue of releasing the azimuth brake and the rotor brake, it becomes possible in that condition that the forces which arise out of the afflux flow of wind and which act in particular on the rotor blades 14 can result in free rotational movement of the machine housing 12 in the azimuth mounting so that the wind 'entrains' the machine housing 12 upon changes in wind direction.

As can be seen from FIG. 3 the position of the rotor blades 14 has remained unchanged in relation to the wind, that is to say the rotor blades 14 are still in the so-called feathered position in which they offer the lowest wind resistance.

As however the machine housing 12 of the wind power installation 10, 12, 14 has been rotated from the windward position into the leeward position, that is to say it has performed a rotary movement through 180°, the rotor blades 14 are also rotated through 180° so that they can retain their position relative to the wind.

Accordingly the rotor blade mounting and the rotor blade drive are constructed to allow such rotary movement.

In this respect, two basic methods and naturally any intermediate variant are possible for varying the position of the rotor blades 14. One possibility provides firstly altering the azimuth position of the machine housing 12 in such a way that the rotor moves from windward to leeward and leaving the position of the rotor blades 14 unchanged during that adjusting movement. The result of this however is that, after a rotary movement of about 90°, the rotor blades 14 are disposed transversely with respect to the wind with their entire surface area, and thus offer the wind the full area to act thereon. Here release of the rotor brake can only limitedly afford a remedy as at least two blades of which one is above the horizontal axis of the rotor and the other is below that axis are acted upon by the wind.

The preferred alternative involves retaining the position of the rotor blades 14 relative to the wind by a continuous change in the position of the rotor blades 14 relative to the wind by virtue of a continuous change in the position of the rotor blades 14 with respect to the machine housing 12 (with the orientation relative to the wind remaining the same) during adjustment of the azimuth position. Thus even in a position of the machine housing 12 transversely with respect to the wind direction 20 the rotor blades 14 are in a feathered position and thus still offer the lowest possible resistance when the wind speed exceeds a second threshold value.

The above-described invention is suitable in particular for wind power installations in an off-shore situation. As it is precisely in off-shore operations, that is to say in the case of wind power installations at the open sea, the expectation is that they are in part exposed to the strongest storms, but at the same time even in the event of minor damage to the installations they can be repaired substantially immediately, the invention ensures that major or minor damage to the parts of the installation simply cannot occur because the adjustment of the rotor blades into the feathered position and the adjustment of the machine housing into the leeward position provides that the wind loading on the whole of the wind power installation and the parts thereof (in particular the pylon) is as low as possible.

The invention claimed is:

1. A method of controlling a wind power installation including a pylon, a machine housing and a rotor with rotor blades, the method comprising:
    moving the rotor blades of the wind power installation into a first position with respect to the machine housing when wind speed is above a first predetermined value which is greater than 20 m/s;
    when wind speed is above a second predetermined value, allowing the wind to move the machine housing into an azimuth position such that the rotor and rotor blades are down wind from a rear end of the machine housing and from the pylon; and
    adjusting the rotor blades' position such that their position with respect to the main wind direction remains substantially unchanged after the machine housing has moved into a down wind position from their position with respect to the main wind direction in their first position.

2. The method according to claim 1 wherein the first position of the rotor blades is a feather position to present low resistance to wind.

3. The method according to claim 1 wherein the rotor blades maintain the first position with respect to the machine housing as the machine housing is moved into the azimuth position.

4. The method according to claim 1 further comprising moving the rotor blades into a second position with respect to the machine housing as the machine housing is moved into the azimuth position, such that the rotor blades retain a position substantially unchanged relative to wind direction during the movement of the machine housing.

5. The method according to claim 4 wherein the second position of the rotor blades with respect to the machine housing is a feather position to present low resistance to the wind.

6. The method of claim 4, further comprising preventing the rotor from rotating when the rotor blades and the machine housing are moving.

7. The method of claim 4, wherein the moving the rotor blades into a first position, the moving the rotor blades into a second position, and the allowing the wind to move the machine housing into an azimuth position is controlled by at least one microprocessor in a control.

8. The method according to claim 1 further comprising detecting wind loads on the rotor blades at the rotor.

9. The method according to claim 1 wherein the azimuth position of the machine housing places the rotor in a leeward position relative to wind direction.

10. A method of operating a wind power installation including a housing having one or more blades mounted thereon, the method comprising:
   rotating the one or more blades to feather the one or more blades if wind speed exceeds a first threshold value while the housing is in a first position;
   rotating the housing to a second, low wind profile position if the wind speed exceeds a second threshold value and rotating the one or more blades to a second position to place the one or more blades in a feathered position in the low wind profile position; and
   adjusting the rotor blades position in such a way that their position with respect to the main wind direction after rotating the housing remains substantially unchanged from their position with respect to the main wind direction when the housing was in the first position.

11. The method according to claim 10 wherein rotating the housing is carried out by turning the housing to have the blades on a downwind side of the housing.

12. The method of claim 10 in which the second threshold is higher than the first threshold.

13. A method of controlling a wind power installation comprising:
   placing rotator blades of the wind power installation into a feathered position so that a rotational speed of the rotator blades is reduced when a wind speed exceeds a first threshold;
   rotating a machine housing to which the rotator blades are connected into a position having a low wind profile position upon the wind speed being a second, higher predetermined speed above a second threshold higher than the first threshold; and
   during the rotating of the machine housing to the low wind profile position, rotating the rotator blades such that the rotator blades remain in a feathered position with respect to wind direction.

* * * * *